United States Patent
Hong et al.

(10) Patent No.: US 7,110,215 B2
(45) Date of Patent: Sep. 19, 2006

(54) BREATHER FILTER AT DOWN-STREAM OF RE-CIRCULATION FILTER

(75) Inventors: Yiren Hong, Singapore (SG); Xiang Chen, Singapore (SG); Jingshi Goh, Singapore (SG); Quock Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 170 days.

(21) Appl. No.: 10/335,461

(22) Filed: Dec. 31, 2002

(65) Prior Publication Data

US 2003/0231424 A1   Dec. 18, 2003

Related U.S. Application Data

(60) Provisional application No. 60/388,275, filed on Jun. 13, 2002.

(51) Int. Cl.
  *G11B 33/14*   (2006.01)
(52) U.S. Cl. .................... 360/97.02; 720/648
(58) Field of Classification Search .......... 360/97.02, 360/97.03; 720/648
See application file for complete search history.

(56) References Cited

U.S. PATENT DOCUMENTS

| | | | | |
|---|---|---|---|---|
| 4,130,845 A | * | 12/1978 | Kulma | 360/97.03 |
| 4,329,722 A | * | 5/1982 | West | 360/97.03 |
| 4,489,356 A | | 12/1984 | Farmer | |
| 4,680,656 A | * | 7/1987 | Manzke et al. | 360/97.03 |
| 4,780,776 A | * | 10/1988 | Dushkes | 360/78.12 |
| 4,857,087 A | | 8/1989 | Bolton et al. | |
| 4,888,655 A | | 12/1989 | Bonn | |
| 5,025,337 A | | 6/1991 | Brooks | |
| 5,034,835 A | * | 7/1991 | Yokoyama | 360/97.02 |
| 5,101,305 A | * | 3/1992 | Ohkita et al. | 360/97.02 |
| 5,229,899 A | | 7/1993 | Brown et al. | |
| 5,307,222 A | * | 4/1994 | Dion | 360/97.02 |
| 5,406,431 A | * | 4/1995 | Beecroft | 360/97.02 |
| 5,455,728 A | * | 10/1995 | Edwards et al. | 360/256.2 |
| 5,764,435 A | * | 6/1998 | Sugimoto et al. | 360/97.02 |
| 5,995,323 A | * | 11/1999 | Jinbo et al. | 360/97.02 |
| 6,208,484 B1 | * | 3/2001 | Voights | 360/97.02 |
| 6,214,070 B1 | * | 4/2001 | Crowder et al. | 55/320 |
| 6,238,467 B1 | * | 5/2001 | Azarian et al. | 96/135 |
| 6,266,208 B1 | * | 7/2001 | Voights | 360/97.02 |
| 6,296,691 B1 | * | 10/2001 | Gidumal | 96/17 |
| 6,515,827 B1 | * | 2/2003 | Raymond et al. | 360/132 |
| 6,557,240 B1 | * | 5/2003 | Voights | 29/603.03 |
| 6,594,108 B1 | * | 7/2003 | Naganathan et al. | 360/97.02 |
| 6,618,222 B1 | * | 9/2003 | Watkins et al. | 360/97.02 |
| 6,654,201 B1 | * | 11/2003 | Smith | 360/97.02 |

(Continued)

*Primary Examiner*—Brian E. Miller
(74) *Attorney, Agent, or Firm*—Leanne R. Taveggia; Westman, Champlin & Kelly, P.A.

(57) ABSTRACT

A data storage system with a breather filter is provided. The enclosure of the data storage system has a first end and a second end and includes a least one disc adapted to rotate in a rotational direction. The second end further includes a first corner and a second corner wherein the second corner is downstream from the first corner relative the rotational direction of the disc. A recirculation filter is spaced radially outward from the disc and disposed between the disc's outer diameter and either the first corner or the second corner. The breather filter is disposed radially outward from the disc and downstream from the recirculation filter relative to the rotation of the disc in a negative air pressure region.

18 Claims, 7 Drawing Sheets

U.S. PATENT DOCUMENTS

| | | | |
|---|---|---|---|
| 6,665,150 B1 * | 12/2003 | Smith | 360/265.7 |
| 6,709,498 B1 * | 3/2004 | Tuma | 96/134 |
| 2002/0036862 A1 | 3/2002 | Tsang et al. | |
| 2002/0075590 A1 | 6/2002 | Garikipati | |
| 2002/0089781 A1 | 7/2002 | Tuma | |
| 2003/0218829 A1 * | 11/2003 | Hong et al. | 360/97.02 |
| 2004/0114273 A1 * | 6/2004 | Fujiwara et al. | 360/97.02 |

* cited by examiner

BREATHER FILTER AT DOWN-STREAM OF RE-CIRCULATION FILTER

CROSS-REFERENCE TO RELATED APPLICATION

This application claims priority from U.S. Provisional Application 60/388,275 filed on Jun. 13, 2002.

FIELD OF THE INVENTION

The present invention relates generally to the field of disc drive data storage devices, and more particularly, but not by limitation, to an improved location for a breather filter.

BACKGROUND OF THE INVENTION

Disc drives are common data storage devices. A typical disc drive includes a rigid housing or deck that encloses a variety of disc drive components. The components include one or more discs having data surfaces that are coated with a magnetizable medium for storage of digital information in a plurality of circular, concentric data tracks. The discs are mounted on a spindle motor that causes the discs to spin and the data surfaces of the discs to pass under respective hydrodynamic or aerodynamic bearing disc head sliders. The sliders carry transducers, which write information to and read information from the data surfaces of the discs.

An actuator mechanism moves the sliders from track-to-track across the data surfaces of the discs. The actuator mechanism includes a motor, such as a voice coil motor, that is generally disassociated from the discs in terms of its relative position within the disc drive housing. Under the control of electronic circuitry, the motor is operated so as to move the actuator mechanism from track-to-track across the data surface of a disc.

The slider typically includes a bearing surface, which faces the data surface of a disc. As the disc rotates, the disc drags air under the slider and along the bearing surface in a direction approximately parallel to the tangential velocity of the disc. As the air passes beneath the bearing surface, air compresses along the airflow path and causes the air pressure between the disc and the bearing surface to increase. This increase in air pressure creates a hydrodynamic or aerodynamic lifting force that counteracts the load force and causes the slider to lift and fly above or in close proximity to the data surface of the disc.

To increase recording area density, it has become desirable, under certain circumstances, to manufacture the disc as smooth as possible in the data zone to accommodate a lowered fly height. During disc drive operation, serious damage to the disc and a loss of data would result during lowered fly height if a particle were to become present between the disc and the recording head. Currently, disc drives contain filtration systems to protect the disc from these particles. A filtration system generally contains subsystems such as a breather filter, a re-circulation filter, a carbon adsorber and diffusion path.

The breather filter is responsible for removing contaminants from incoming air entering from the external environment into the disc drive. To ensure that air flows through the breather filter, the location for the breather filter is typically in a low pressure region. Generally, breather filters are placed under or above the disc where a negative air pressure region exists with respect to an ambient air pressure outside of the disc drive. However, airflow through the breather filter is not always completely clean. The airflow may contain unfiltered particles or chemical vapor. As a result, the placement of the breather filter under or above the disc exposes the disc to a great risk of becoming contaminated by harmful materials. Furthermore, particles that are trapped by the breather filter can be deposited onto the disc under a shock or vibration event.

Embodiments of the present invention provide solutions to these and other problems and offer other advantages over the prior art.

SUMMARY OF THE INVENTION

The present invention provides an improved location for a breather hole and breather filter in a data storage system. To achieve the foregoing objective, a disc drive includes an enclosure with a first end and a second end. At least one disc within the enclosure is configured to rotate about an axis in a rotational direction. A first corner and a second corner are adjacent the second end, wherein the second corner is downstream from the first corner relative to the rotational direction of the disc.

An obstruction is spaced radially outward from the disc and disposed between an outer diameter of the disc and the second corner adjacent the second end of the enclosure. The obstruction creates a negative air pressure area radially outward from the disc. The breather hole and breather filter, are also spaced outwardly from the disc and disposed downstream and proximate the obstruction in the negative air pressure area.

DETAILED DESCRIPTION OF ILLUSTRATIVE EMBODIMENTS

Figure 1:
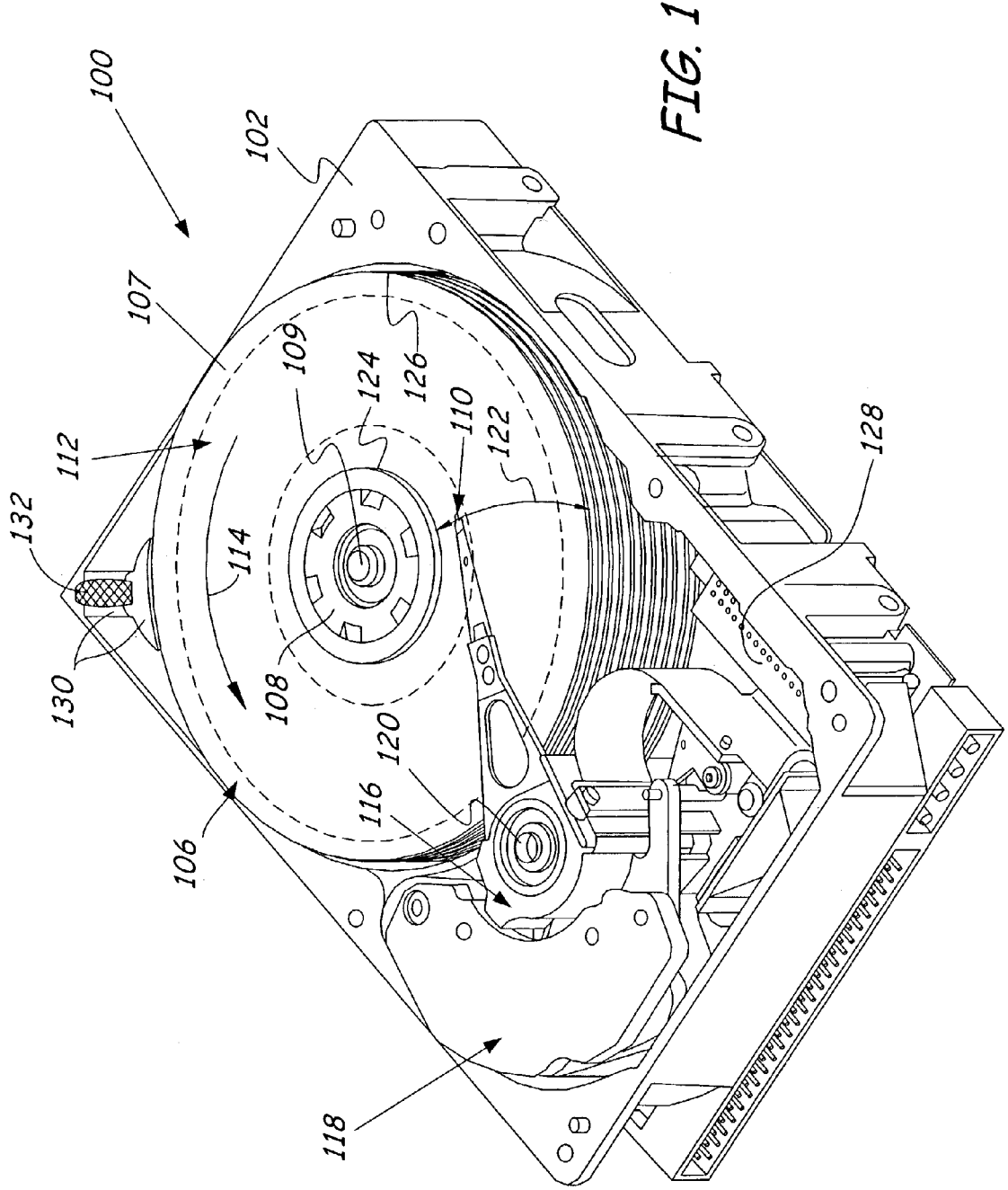
FIG. 1 is an isometric view of a data storage system.

Referring to FIG. 1, a disc drive 100 is depicted in which embodiments of the present invention are useful. Disc drive 100 includes an enclosure with a base member 102 and a top cover (not shown). Disc drive 100 further includes a disc pack 106, which is mounted on a spindle motor (not shown) by a disc clamp 108. Disc pack 106 can include one or more discs and illustrated with a plurality of individual discs 107, which are mounted for co-rotation about axis 109. Each disc surface has an associated slider 110, which carries a read/write head for communication with the disc surface. The read/write head can include any type of transducing head, such as an inductive head, a magneto-resistive head, an optical head or a magneto-optical head or other storage technique.

In the example shown in FIG. 1, sliders 110 are supported and attached to an actuator 116. The actuator shown in FIG.

1 is of the type known as a rotary moving coil actuator and includes a voice coil motor (VCM), shown generally at 118. VCM 118 rotates actuator 116 with its attached sliders 110 about a pivot shaft 120 to position sliders 110 over a desired data zone 112 along a path 122 between a disc inner diameter 124 and a disc outer diameter 126. Voice coil motor 118 is driven by servo electronics 128. Other types of actuators can also be used, such as linear actuators.

During operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic or aerodynamic lifting force that counteracts the load force provided by actuator 116 and causes the sliders 110 to lift and fly above or in close proximity to the disc surfaces. However, the present invention is applicable to storage systems which use other techniques.

Disc drive 100 is not a closed system. An exchange of air equalizes pressure differentials between the internal air of disc drive 100 and the ambient air of the surroundings. If pressure differentials between the internal disc drive 100 and the ambient surroundings are not equalized the enclosure can deform as air pressure either increases or decreases in the ambient surroundings. Such deformation can cause actuator 116 to be forcefully tilted from its original position and cause disc pack 106 to fail.

The above-described exchange of air can result in the introduction of particles or harmful chemicals into the enclosure. These contaminants pose serious dangers to discs 107, especially in high-density systems in which discs 107 are manufactured as smooth as possible in the data zone 112 to achieve a lowered fly height. To control contaminants, disc drive 100 contains sub-filtration systems such as recirculation filter 132 and breather filter (not shown in FIG. 1).

Discs 107 rotate in a counterclockwise rotational direction 114, which induces significant airflow within base support member 102 in the same rotational direction 114. This airflow may contain harmful contaminants. Filter support 130 supports recirculation filter 132 as the recirculation filter 132 removes contaminants from the air before the air is recirculated back to disc pack 106.

Figure 2:
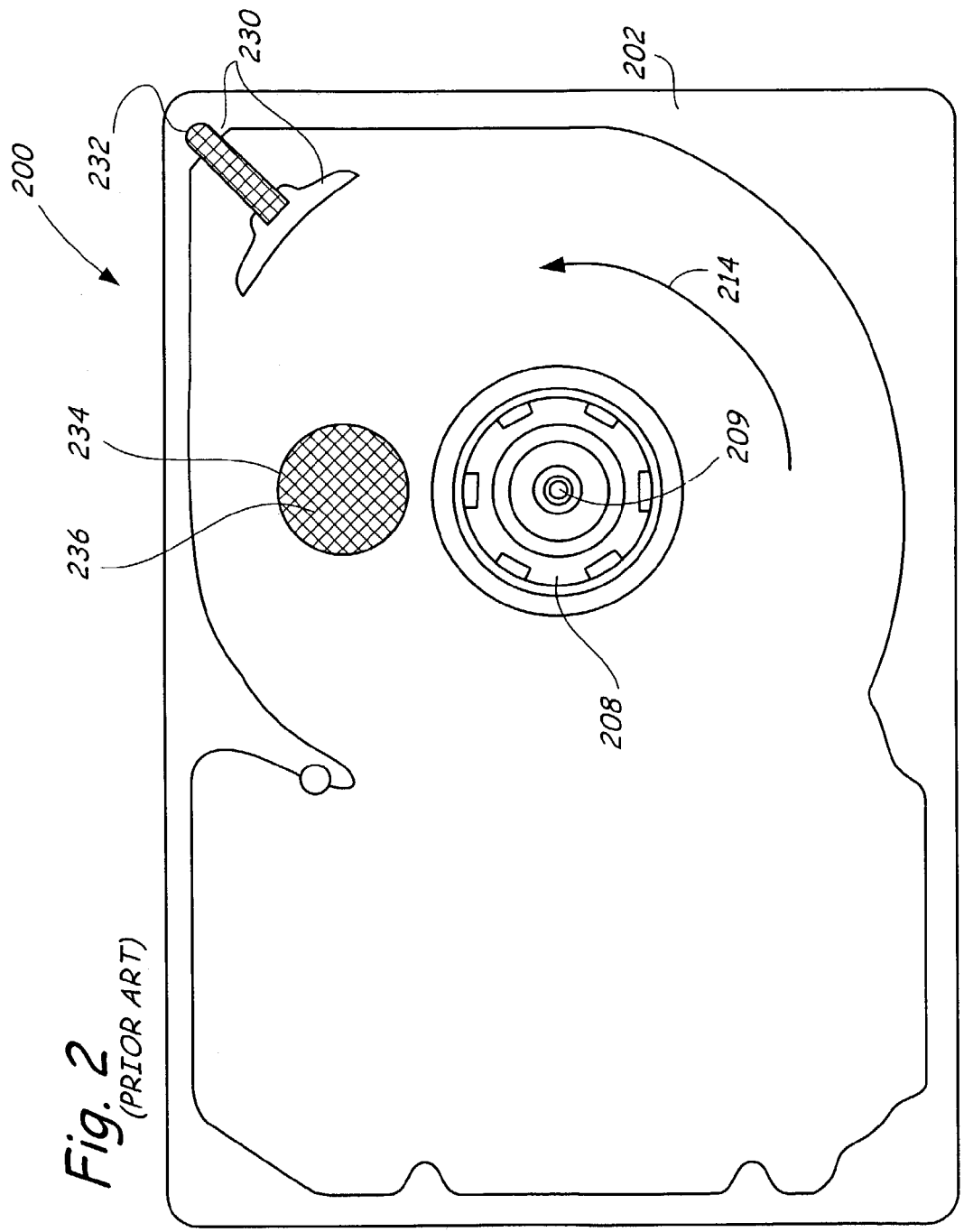
FIG. 2 is a top plan view of a prior art base member for a data storage system.

Referring to FIG. 2, an enclosure with a base member 202 of a prior art disc drive 200 is shown. Base member 202 is configured for incorporation into a data storage system. For example, base member 202 can be substituted for base member 102 within disc drive 100 (see FIG. 1). Base member 202 has filter support 230 configured to support recirculation filter 232.

When a data storage system is operational, the discs (not shown in FIG. 2) are configured to rotate about axis 209 and are secured to the base member 202 by disc clamp 208. The rotation of the discs causes air to be forced through the recirculation filter 232 in a rotational direction 214. Recirculation filter 232 removes contaminates from the inner drive airflow and then allows airflow to recirculate throughout disc drive 200.

Also included in base support member 202 is a breather hole 234 located on the bottom of the base member 202. Breather hole 234 supports a breather filter 236. As air enters from the external environment and into the enclosure through breather hole 234, breather filter 236 removes contaminants. To ensure that incoming air flows through the breather hole 234, the breather hole 234 and breather filter 236 are placed either under or above the discs where a low air pressure region exists with respect to the outside ambient air pressure. The placement of breather hole 234 in the low air pressure region ensures that air entering the disc drive will enter through the breather filter 236 and exit through other small openings in the enclosure located in high air pressure regions.

Air entering the enclosure is not always completely clean even after it has flowed through the breather filter 236. The air may still contain unfiltered particles or chemical vapors. Positioning breather filter 236 and breather hole 234 directly above or directly below a disc, exposes the disc to harmful contaminants. Furthermore, particles that become trapped by breather filter 236 may be freed from the filter and deposited onto the disc, for example, if the drive is exposed to a vibration or shock event.

Figure 3:
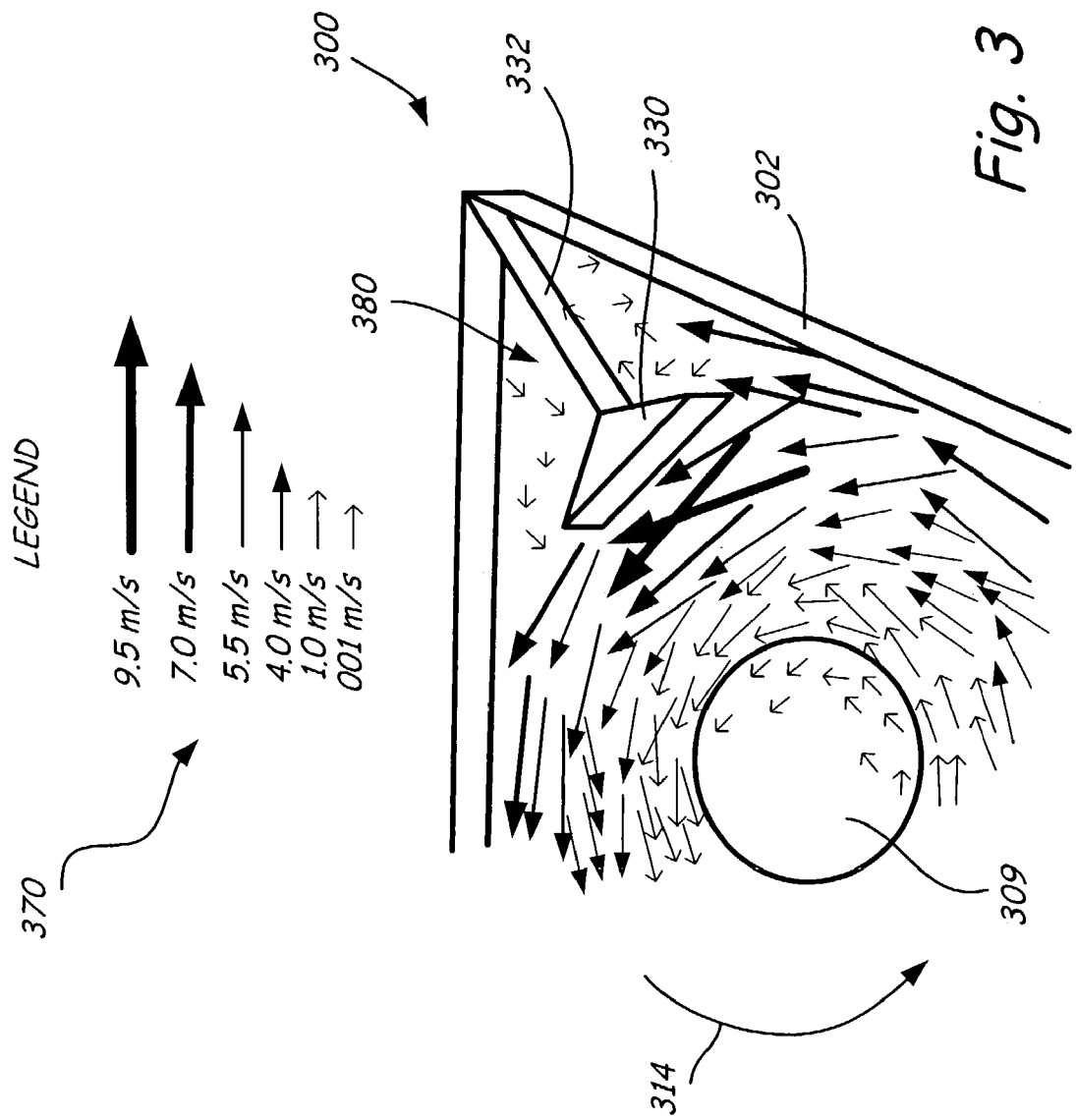
FIG. 3 is a perspective view of a portion of a disc drive showing the velocity vectors of airflow within a disc drive in accordance with an embodiment of the invention.

Referring next to FIG. 3, a portion of a disc drive 300 is shown and used to illustrate inner drive airflow velocities. Similar to prior art disc drive 200 in FIG. 2., disc drive 300 has a base member 302 where rotatable discs (not shown in FIG. 3) are attached to the base member and rotate about a axis 309. The rotational direction 314 of the rotatable discs coincides with the direction of induced airflow by the discs. Unlike prior art disc drive 200, disc drive 300 illustrates airflow velocity vectors representing the speed of air throughout the disc drive by contrasting line thickness and lengths as shown by legend 370. At the axis 309, the air speed is very low or almost zero. As the distance extends outwardly from the axis 309 to the disc outer edge (not shown in FIG. 3), the inner drive airflow increases in velocity.

Base member 302 also includes recirculation filter 332 supported by filter support 330. The recirculation filter 332 is placed in the airflow and acts as an obstruction by slowing the high air velocity along the outer edge of the disc as shown by the vectors adjacent the recirculation filter 332. This sudden change in velocity across recirculation filter 332 results in a negative pressure region 380 located downstream of the recirculation filter 332 with respect to the rotational direction 314.

Figure 4:
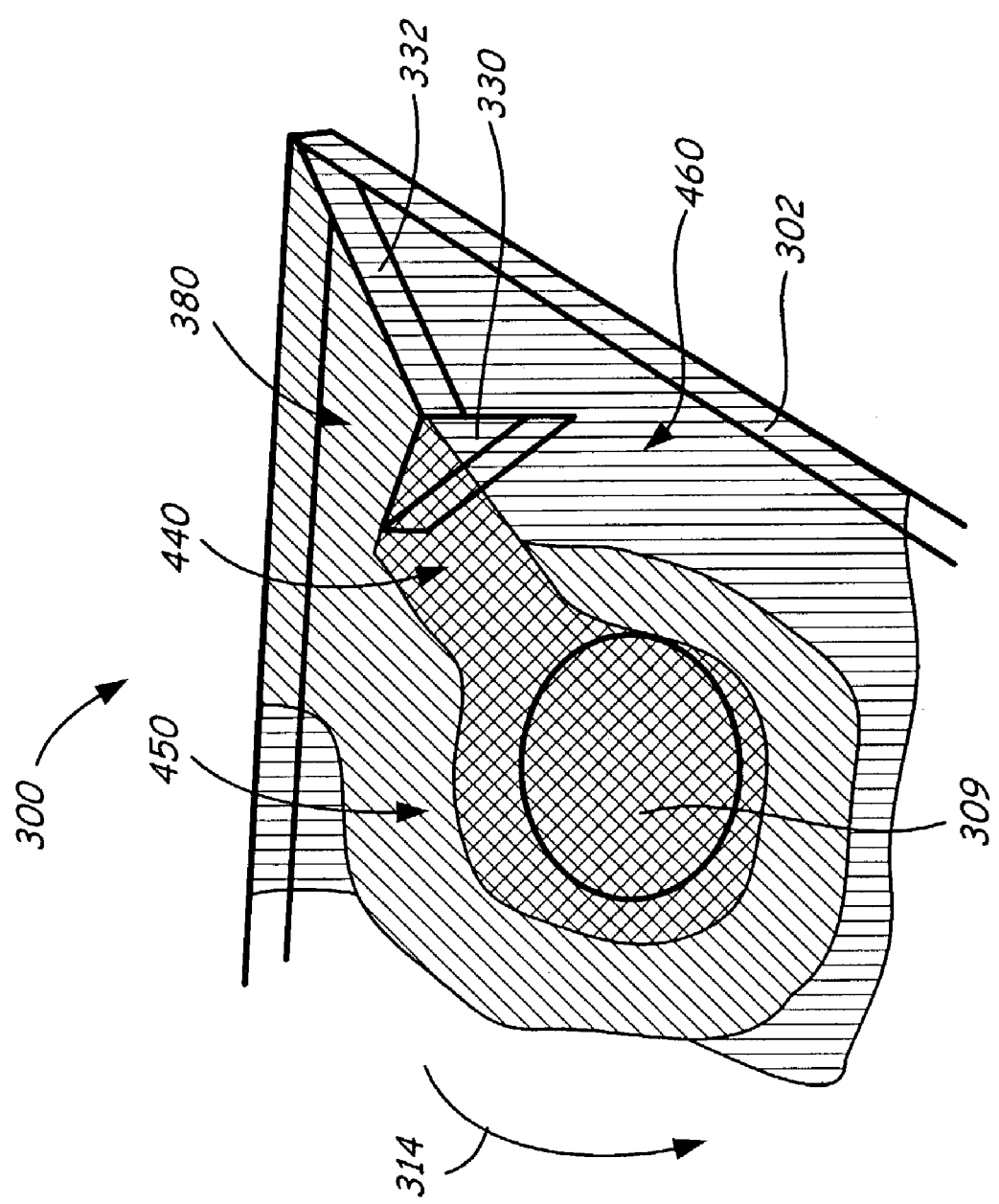
FIG. 4 is a perspective view of a portion of a disc drive showing the related air pressures areas within a disc drive in accordance with an embodiment of the invention.

FIG. 4 is the portion of disc drive 300 as in FIG. 3. However, disc drive 300 of FIG. 4 is shown and used to illustrate the distribution of relative air pressures as they relate to the airflow velocities of FIG. 3. Base member 302 of disc drive 300 shows three different pressure distribution regions 440, 450 and 460. Region 460 represents the highest pressure with values approximately between, −15 and 30 pascals. Region 450 represents a pressure approximately between −20 and −15 pascals. Region 440 represents the lowest pressure with values approximately between −30 and −20 pascals.

As the high velocity airflow in FIG. 3 encounters recirculation filter 332 in FIGS. 3 and 4, a high-pressure region 460 is produced. After airflow is forced through the recirculation filter 332, a low-pressure region 450 is produced due to a pressure drop across the recirculation filter 332 (see FIGS. 3 and 4). Low-pressure region 450 is above and below the discs and also extends outwardly from the disc. The negative air pressure region 380, defined as the low-pressure region outwardly from the disc (not shown in FIGS. 3 and 4), provides a new location for a breather hole and breather filter (not shown in FIGS. 3 and 4).

Figure 5:
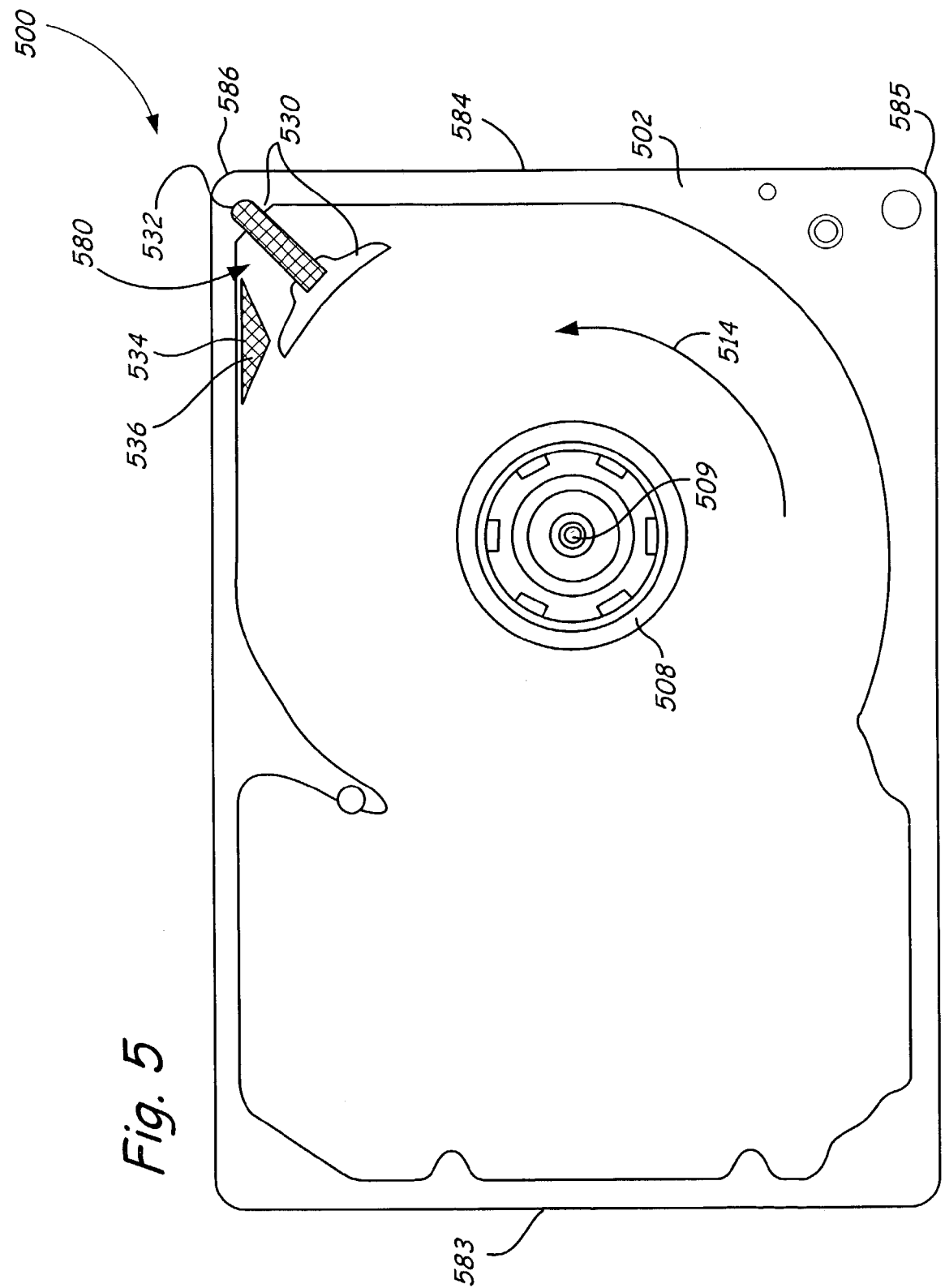
FIG. 5 is a top plan view of a base member of a disc drive in accordance with an embodiment of the invention.

FIG. 5 is a top view of disc drive 500 and shows one embodiment in accordance with the present invention. Base member 502 is configured for incorporation into a data storage system. For example, base support member 502 can be substituted for base member 102 in disc drive 100 (see FIG. 1).

Base member 502 includes rotatable discs (not shown in FIG. 5) configured to rotate about axis 509 and are secured to the base member 502 by disc clamp 508. During operation, the discs spin or rotate about the axis 509 and induce an air movement in a counterclockwise direction 514 in a manner similar to direction 114 described above in FIG. 1. In addition, disc drive 500 has a first end 583 and a second end 584 with a first corner 585 and a second corner 586 adjacent the second end 584. The second corner 586 is downstream relative to rotational direction 514 from the first corner 585.

Base member 502 includes filter support 530 configured to support recirculation filter 532. Recirculation filter 532 is disposed radially outward from the outer diameter of the discs (not shown in FIG. 5) and between the discs and the second corner 586. The function of the recirculation filter 532 is to remove airborne particles inside disc drive 500. In accordance with the present invention, larger volumes of air may be filtered when the recirculation filter 532 is placed outwardly from the disc because the velocity of air is much higher at this location.

The recirculation filter 532 acts as an obstruction to form a negative pressure region 580 downstream from the recirculation filter 532 relative to the rotational direction 514. A breather hole 534 and a breather filter 536 are disposed within the negative air pressure region 580 on the bottom of the base member 502 and spaced apart at least 1 mm downstream from the recirculation filter 532. A distance ranging between 3 and 7 mm from the recirculation filter 532 is preferable.

The breather hole 534 and breather filter 536 geometry may be of a wide variety of shapes. In one embodiment, breather hole 534 and breather filter 536 have a triangular shape to fit adjacent to recirculation filter 532.

External ambient air enters the enclosure through the breather hole 534 where low air pressure exists, while internal air in the enclosure exits through small openings where high air pressure exists. Breather hole 534 located within the negative air pressure region 580 prevents direct exposure of unfiltered contaminants to the discs. Furthermore, particles trapped by breather filter 536 will not easily deposit onto the discs under a vibration or shock event. For example, with a prior art breather filter located directly above or below the discs (see FIG. 2), trapped particles on the filter can fall onto the discs if the storage system is dropped or placed under vibration conditions. The breather hole 534 is located radially outward from the discs. Particles are incapable of directly depositing on the discs because the particles must take a longer path to the discs.

Figure 7:
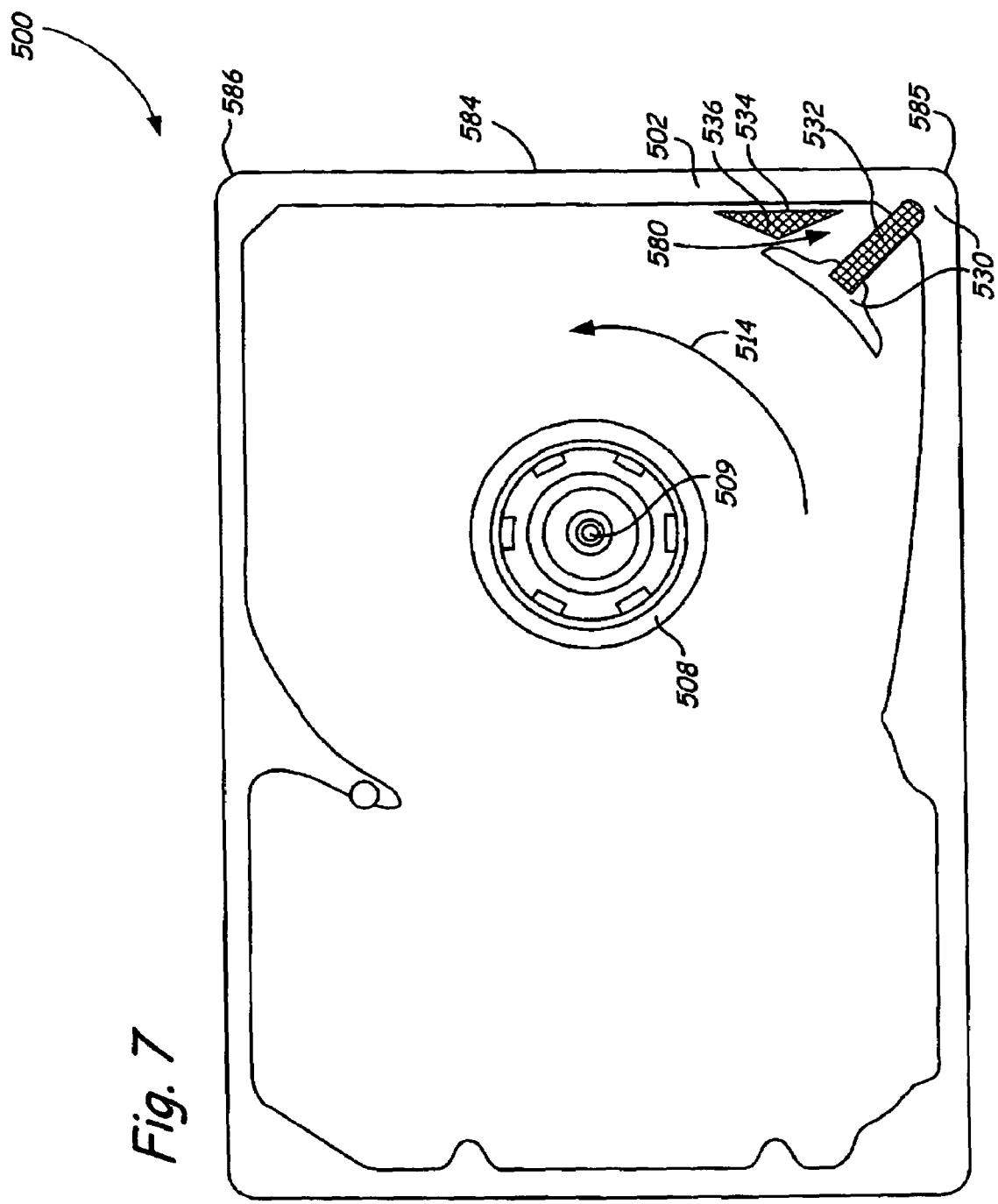
FIG. 7 is a top plan view of a base member of a disc drive in accordance with an embodiment of the invention.

In addition, recirculation filter 532 can be placed radially outward from the discs and between the outer diameter of the discs and the first corner 585 of disc drive 500 (see FIG. 7). As a result, a negative pressure region 580 forms downstream from the new recirculation filter location relative to the rotational direction 514. In one embodiment, the breather hole 534 and breather filter 536 are located at the bottom of base 502 in a triangular geometry and spaced apart at least 1 mm downstream from the recirculation filter 532. A distance ranging between 3 and 7 mm from the recirculation filter 532 is preferable.

Figure 6:
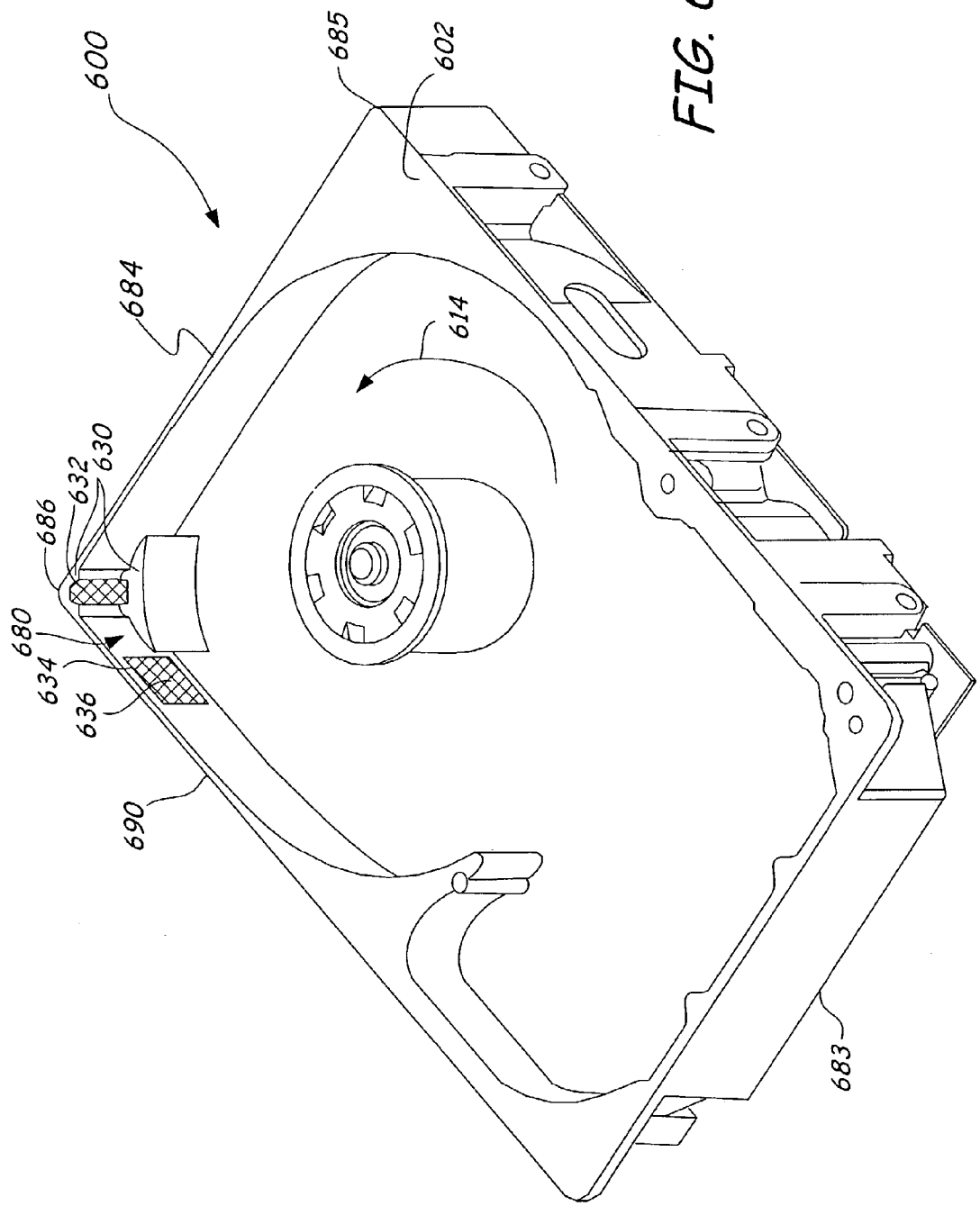
FIG. 6 is a perspective view of a base member of a disc drive in accordance with an embodiment of the invention.

FIG. 6 is a perspective view of a disc drive 600 and shows another embodiment in accordance with the present invention similar to disc drive 500 (see FIG. 5). Disc drive 600 has a base member 602 with filter support 630 and recirculation filter 632. In the embodiment of FIG. 6, a sidewall 690 connects the base member 602 and the top cover (not shown).

A negative pressure region 680 forms downstream from the recirculation filter 632 relative to the rotational direction 614. A breather hole 634 and a breather filter 636 are disposed within the negative air pressure region 680 on the sidewall 690 of the disc drive 600. In one embodiment, the breather hole 634 and breather filter 636 are spaced apart at least 1 mm downstream from the recirculation filter 632. A distance ranging between 3 and 7 mm from the recirculation filter 632 is preferable.

The breather hole 634 and breather filter 636 geometry may be of a wide variety of shapes. Breather hole 634 and breather filter 636 can have a rectangular shape to fit adjacent to recirculation filter 632 and on the sidewall 690.

In addition, recirculation filter 632 can also be placed radially outward from the discs and between the outer diameter of the discs and the first corner 685 of disc drive 600. As a result, a negative pressure region 680 forms downstream from the new recirculation filter location relative to the rotational direction 614. The breather hole 634 and breather filter 636 are located on second end 684 in a rectangular geometry and spaced apart at least 1 mm downstream from the recirculation filter 632. A distance ranging between 3 and 7 mm from the recirculation filter 632 is preferable.

The breather filters 536 and 636 and recirculation filters 532 and 632 of FIGS. 5 and 6 contain a large surface area and a high propensity to capture harmful vapors and particulate. For example, the filters can comprise carbon granules, coated granules with potassium carbonate, pleated (folded) electrostatic non-woven fabrics and the like.

In summary, one embodiment of the present invention pertains to a data storage system. The data storage system includes an enclosure having a first end (such as 583, 683) and a second end (such as 584, 684). The enclosure includes at least one disc (not shown in FIGS. 5 and 6) coupled to a base member (such as 502, 602) and adapted to rotate in a rotational direction (such as 514, 614). The second end (such as 584, 684) includes a first corner (such as 585, 685) and a second corner (such as 586, 686). The second corner (such as 586, 686) is downstream relative to the rotational direction (such as 514, 614) of the disc from the first corner (such as 585, 685). The enclosure also includes an actuator (see FIG. 1) configured to position a transducing head relative to the disc. An obstruction (such as 532, 632) is placed radially outward from the disc and disposed between the outer diameter of the disc (see FIG. 1) and one of the first corner (such as 585, 685) and the second corner (such as 586, 685). Lastly, a breather hole (such as 534, 634) is spaced radially outward from the disc and disposed downstream relative to the rotational direction of the disc and proximate the obstruction (such as 532, 632).

Another embodiment of the invention pertains to a method of removing contaminants from an incoming airflow into a data storage system. The method includes providing an enclosure, generating an inner drive airflow with at least one disc (not shown in FIGS. 5 and 6) in a rotational direction (such as 514, 614), and forming a negative air pressure region (such as 580, 680) outside the disc. The negative air pressure region (such as 580, 680) is downstream and proximate the obstruction (such as 532, 632) relative to the rotational direction (such as 514, 614) of the inner drive airflow. The method also includes filtering the incoming airflow with a breather filter (such as 536, 636) and locating the breather filter (such as 536, 636) radially outward from the disc and within the negative air pressure region (such as 580, 680).

It is to be understood that even though numerous characteristics and advantages of embodiments of the invention have been set forth in the foregoing description with details of the structure and function, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular application for a data storage system while maintaining substantially the same functionality without departing from the scope and spirit of the present invention. In addition, although the embodiments described herein are directed to an improved breather filter location within a data storage system, it will be appreciated by those skilled in the art that the teachings of the present invention can be applied to other systems that employ similar types of enclosures, without departing from the scope and spirit of the present invention.

What is claimed is:

1. A data storage system comprising:
    an enclosure having a first end and a second end;
    an actuator pivot located closer to the first end than the second end of the enclosure;
    at least one disc coupled to a base member of the enclosure, wherein the at least one disc is adapted to rotate about an axis in a rotational direction and generate a generally radial airflow path the axis being closer to the second end than the first end;
    a first corner and a second corner adjacent the second end, wherein the second corner is downstream relative to the rotational direction of the generally radial airflow path from the first corner,
    an obstruction spaced radially outward from the disc and disposed at one of the first corner and second corner, wherein the obstruction extends into the generally radial airflow path to thereby obstruct the flow of air in the generally radial airflow path; and
    a breather hole spaced radially outward from the disc and disposed downstream from and proximate the obstruction with respect to the generally radial airflow path and disconnected from the obstruction.

2. The apparatus of claim 1, wherein the obstruction comprises a recirculation filter.

3. The apparatus of claim 2, wherein the recirculation filter is positioned between the outer diameter of the disc and the first corner.

4. The apparatus of claim 2, wherein the recirculation filter is positioned between the outer diameter of the disc and the second corner.

5. The apparatus of claim 1 including a breather filter positioned in the breather hole.

6. The apparatus of claim 5, wherein the breather filter has a triangular shape.

7. The apparatus of claim 5, wherein the breather filter has a rectangular shape.

8. The apparatus of claim 1 wherein the breather hole is spaced at least 1 mm downstream from the obstruction.

9. The apparatus of claim 8 wherein the breather hole is spaced between 3 and 7 mm downstream from the obstruction.

10. The apparatus of claim 1, wherein the enclosure further comprises:
    a top cover;
    sidewalls connecting the base member and the top cover; and
    a bottom surface on the base member, wherein the breather hole is further disposed on the bottom surface of the base member.

11. The apparatus of claim 1, wherein the enclosure further comprises a top cover and sidewalls connecting the base member and the top cover, wherein the breather hole is further disposed on the sidewall.

12. A method of removing contaminants from incoming airflow into a data storage system, comprising:
    providing an enclosure;
    generating a generally radial inner drive airflow with at least one disc in a rotational direction;
    forming a negative air pressure region outside the disc and in proximity to a corner of an end of the enclosure that is further from an actuator pivot than the disc by extending an obstruction into the generally radial inner drive airflow, wherein the negative air pressure region is downstream and proximate the obstruction relative to the rotational direction of the generally radial inner drive airflow;
    filtering an airflow that flows through a breather hole from outside the data storage system to inside the data storage system with a breather filter, wherein the breather hole is disconnected from the obstruction; and
    locating the breather filter radially outward from the disc and within the negative air pressure region.

13. The method of claim 12, wherein the obstruction comprises a recirculation filter.

14. The method of claim 12, wherein providing the enclosure further comprises providing a bottom surface and sidewalls.

15. The method of claim 14 further comprising locating the breather filter on one of the bottom surface and the sidewalls.

16. The method of claim 12 wherein locating the breather filter is at least 1 mm downstream of the obstruction.

17. The method of claim 12 wherein locating the breather filter is between 3 and 7 mm downstream of the obstruction.

18. A data storage system comprising:
    an enclosure;
    at least one disc coupled to a base member of the enclosure, wherein the at least one disc is adapted to rotate in a rotational direction and generate a generally radial inner drive airflow path;
    an obstruction disposed radially outward from the disc and in the generally radial inner drive airflow path, the obstruction located in proximity to a corner of an end of the enclosure that is further from an actuator pivot than the disc;
    a negative air pressure region formed radially outward from the disc and downstream and proximate the obstruction relative to the rotational direction of the disc; and
    a breather hole containing a breather filter disposed in the negative air pressure region, the breather filter disconnected from the obstruction and configured to filter an airflow that flows through the breather hole from outside the data storage system to inside the data storage system.

* * * * *